United States Patent [19]
Landi et al.

[11] Patent Number: 5,180,619
[45] Date of Patent: Jan. 19, 1993

[54] PERFORATED HONEYCOMB

[75] Inventors: Curtis L. Landi; Susan L. Wilson, both of Sunnyvale, Calif.

[73] Assignee: Supracor Systems, Inc., Calif.

[21] Appl. No.: 717,523

[22] Filed: Jun. 19, 1991

Related U.S. Application Data

[63] Continuation-in-part of Ser. No. 446,320, Dec. 4, 1989, Pat. No. 5,039,567.

[51] Int. Cl.$^5$ ............................................. B32B 3/12
[52] U.S. Cl. ..................................... 428/116; 52/806; 428/131
[58] Field of Search ................. 428/116, 118, 73, 131; 52/806; 156/197, 252, 292

[56] References Cited

U.S. PATENT DOCUMENTS

| | | | |
|---|---|---|---|
| 2,887,425 | 5/1959 | Holland | 428/116 X |
| 3,007,834 | 11/1961 | Moeller et al. | 428/116 X |
| 3,018,205 | 1/1962 | Barut | 428/116 |
| 3,483,070 | 12/1969 | Kennedy et al. | 428/118 |
| 3,502,171 | 3/1970 | Cowan | 428/116 X |
| 3,556,917 | 1/1971 | Eakin et al. | 428/118 X |
| 3,561,561 | 2/1971 | Trainor | 181/267 |
| 3,664,906 | 5/1972 | Hartig | 428/118 X |
| 3,690,606 | 9/1972 | Pall | 428/116 X |
| 3,821,999 | 7/1974 | Guess et al. | 428/116 X |
| 3,895,152 | 7/1975 | Carlson et al. | 428/116 |
| 4,211,302 | 7/1980 | Matthews et al. | 181/248 |
| 4,211,303 | 7/1980 | Matthews et al. | 181/248 |
| 4,265,955 | 5/1981 | Harp et al. | 428/116 |
| 4,269,882 | 5/1981 | Carrillo et al. | 428/116 |
| 4,291,079 | 9/1981 | Hom | 428/116 |
| 4,422,183 | 12/1983 | Landi et al. | 428/116 X |
| 4,485,568 | 12/1984 | Landi et al. | 428/116 X |
| 5,030,305 | 7/1991 | Fell | 428/116 X |
| 5,039,567 | 8/1991 | Landi et al. | 428/116 |

Primary Examiner—Henry F. Epstein
Attorney, Agent, or Firm—Rosenblum, Parish & Isaacs

[57] ABSTRACT

A panel of perforated thermoplastic material having sound and shock dampening characteristics comprised of a perforated honeycomb core and either whole or perforated facing sheets, thermal compression bonded to the core. The core can be faced on one side only, or on both sides to create a pad or panel of such material.

9 Claims, 3 Drawing Sheets

PERFORATED HONEYCOMB

This application is a continuation-in-part of our co-pending U.S. patent application Ser. No. 07/446,320 filed Dec. 4, 1989 now U.S. Pat. No. 5,039,567.

BACKGROUND OF THE INVENTION

1. Field of the Invention

This invention relates generally to thermoplastic honeycomb material, and more particularly to honeycomb panels made from thermoplastic elastomeric materials having perforations in the walls of the honeycomb core and/or in the facing material attached to the ends of the core walls.

2. Brief Description of the Prior Art

Early honeycomb panels were made from rigid materials which were both strong and lightweight. These materials, however, were not resilient and would permanently deform if crushed. See for example, the U.S. Pat. Nos. to Barut 3,018,205, Eakin et al. 3,556,917, and Kennedy et al. 3,483,070.

Applications of honeycomb made from resilient materials include Holland 2,887,425, and Landi et al. Nos. 4,422,183 and 4,485,568. Resilient honeycomb is made from thermoplastic elastomeric strips that are intermittently bonded together at staggered intervals along the length of the strip. The thermoplastic materials used in the manufacture of the honeycomb core provide resiliency so that the honeycomb returns to its original shape following deformation. Resilient honeycomb is used for shock absorption and vibration dampening as well as lightweight insulation.

The resilient honeycomb of the prior art consisted of whole strips of intermittently bonded thermoplastic that were stretched open to create the core. If facings were used, they too were made from whole material, and bonded to the planar surface created by the wall edges of the honeycomb core. The benefits of perforating the core walls and/or facings had not been fully realized. Perforating the thermoplastic material changes the response characteristics of the material by increasing the resiliency of the honeycomb while decreasing the total weight. Perforated honeycomb is lighter in weight than non-perforated honeycomb. Additionally, where a perforated honeycomb core is used with non-perforated facing material, liquids or gases contained therewithin can be transferred between the cells.

SUMMARY OF THE INVENTION

It is therefore a primary objective of the present invention to provide resilient honeycomb coring made from perforated thermoplastic elastomeric materials.

Another object of the present invention is to provide panels of a resilient material comprised of a perforated honeycomb core that is faced with sheets of either perforated or non-perforated thermoplastic material.

Still another object of the present invention is to provide panels having a perforated honeycomb core which absorb or dissipate sound as well as vibration.

A further object of the present invention is to provide perforated honeycomb that is reduced in weight, yet has increased resilience as well as increased flexibility.

Briefly, a preferred embodiment of the present invention includes a panel comprised of a core of perforated, thermoplastic elastomeric honeycomb bonded to and disposed between two sheets of thermoplastic elastomeric facing material. The core is made from a plurality of advanced grade, thermoplastic elastomeric sheets that have been perforated, such that there is a matrix of small holes in the material. The sheets are stacked and intermittently fusion welded or bonded to form a stack from which elongated segments can be severed and expanded to form a honeycomb-like network of cells. The cores may then have a sheet of thermoplastic material fusion-bonded to one or both sides thereof. The material from which the core and/or facing sheets are made may be plain or reinforced with suitable materials such as fabrics or fibers.

Where perforated facings are used, the holes in the facing allow air or fluid to enter into, and be distributed through, the cells of the honeycomb core. Upon entry into the core, any pressure wave associated with the fluid flow will disperse and dissipate, so that any pressure wave (sound, for example) that does travel completely through the perforated panel is muffled.

An important advantage of the present invention is that the plurality of small holes disposed the honeycomb core material will entrap and disburse sound within the cells of the core, thus any sound that succeeds to pass through the honeycomb will at least be muffled.

Another advantage of the present invention is that the honeycomb, because it is perforated, is lighter in weight than non-perforated honeycomb or most materials used for acoustic insulation.

A further advantage of the present invention is that the elastomeric material comprising the honeycomb and/or facings may be of various strengths and thicknesses to provide absorption or dissipation, whichever characteristic is more desirable.

Yet another advantage of the present invention is that the perforated honeycomb is resilient and thus will deform under pressure and then return to its original shape when the pressure is lifted.

These and other objects and advantages of the present invention will no doubt become apparent to those skilled in the art after having read the following detailed description of the preferred embodiment which is contained in and illustrated by the various drawing figures.

DETAILED DESCRIPTION OF THE PREFERRED EMBODIMENT

Figure 1:
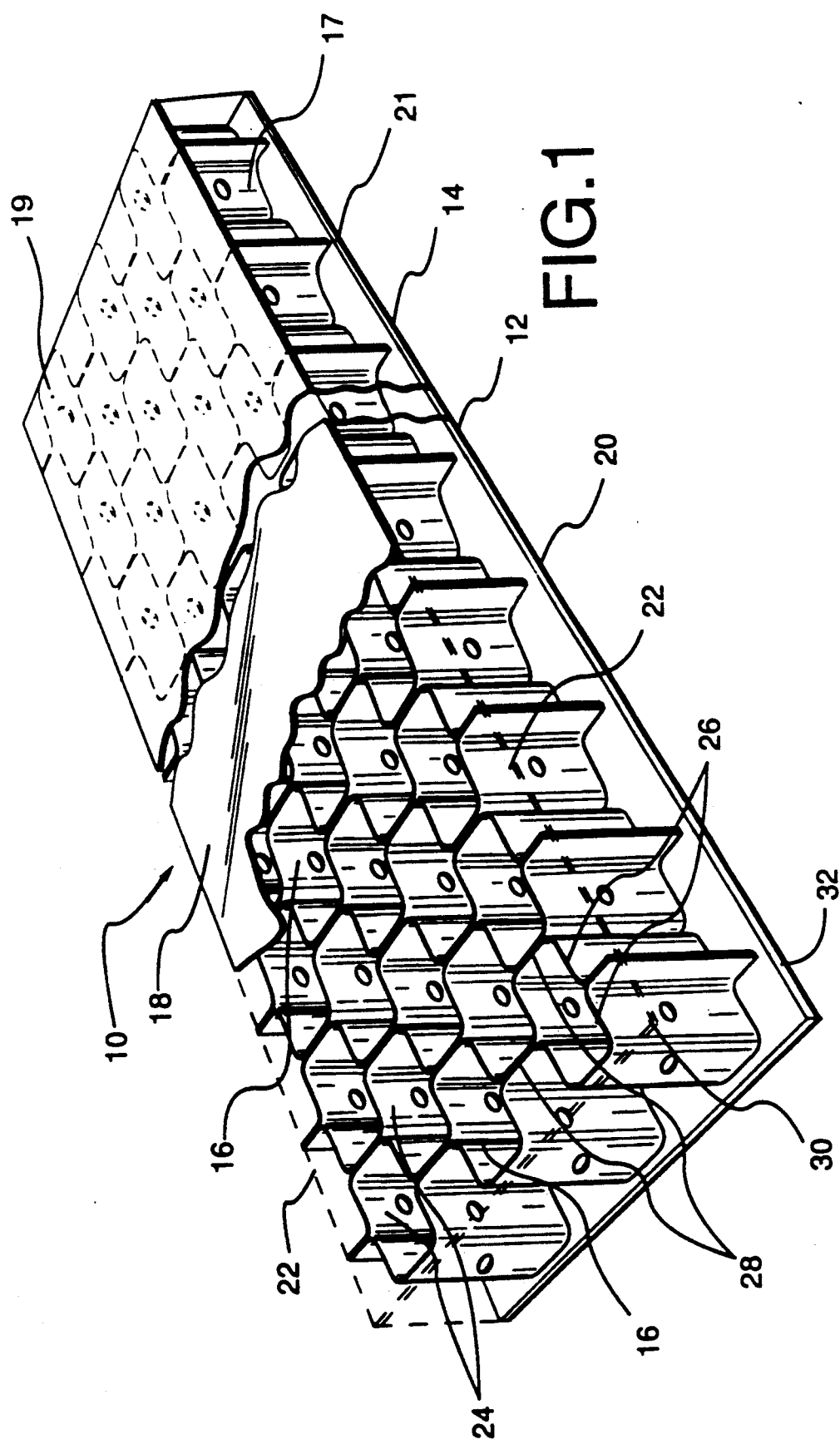
FIG. 1 is a perspective view of a block of material of the present invention with the facing broken away to reveal the perforated honeycomb core, and also illustrated is a separate section of material having a perforated honeycomb core as well as perforated facing material.

FIG. 1 is a perspective view of a block 10 of material fabricated in accordance with the present invention. The block 10 is broken into two sections 12 and 14 to illustrate alternative embodiments.

The left half 12 of the block shows material having a perforated honeycomb core 16 and unperforated or solid facings 18 and 20. The top facing 18 is broken away to show the perforated honeycomb core 16. The dashed lines 22 illustrate the normal full coverage of the top facing 18.

The honeycomb core 16 is made from sheets of an advanced grade thermoplastic elastomeric material that have been perforated such that a matrix of small holes exist throughout. The sheets are compression bonded together at spaced intervals staggered between alternate sheets as described in our copending U.S. patent application Ser. No. 07/446,320 filed Dec. 4, 1989, now U.S. Pat. No. 5,039,567 and incorporated herein by reference. The resulting stack is then cut into strips which, when expanded, create a honeycomb network of elongated, generally hexagonally shaped cells 24.

Each cell 24 of the honeycomb core 16 is defined by four generally S-shaped wall segments, each interior wall of which is shared by an adjacent cell. The wall segments of each cell 24 include single thickness wall portions 26 and double thickness wall portions 28, the latter portions being disposed on each side of the cell where the side wall of one cell is compression bonded to the side wall of an immediately adjacent cell.

The upper and lower extremities of the walls forming the several cells are deformed during a planarization operation disclosed in our above-identified copending U.S. patent application and create upper and lower extremities 30 and 32 of the honeycomb core. Facings 18 and 20, cut from sheets of a resilient thermoplastic material, are then compression-bonded to the top and bottom core faces 30 and 32. The addition of the facings 18 and 20 strengthens the core 16 and provides an ample surface for adhering a panel of the material to a wall, board or other surface.

The right half 14 of the block depicted in FIG. 1 includes a perforated honeycomb core 17 similar to the left half 12 of the block, but has facings 19 and/or 21 made of perforated material. The dashed lines indicate the honeycomb pattern of the core 17 underneath the top facing 19. By perforating both the honeycomb core and the facings, the weight of the material is reduced while the resiliency and flexibility is increased. The weight is reduced because the perforations reduce the overall quantity of material comprising the honeycomb and facings. Similarly, the flexibility is increased because there is less material to constrain each segment of the material from bending. The resiliency, or ability of the structure to spring back to its original form after being compressed, is also enhanced by virtue of the additional passages through which air can return to fill the cells.

It will be appreciated that the resilient but damped restorative characteristics of the structure make it an excellent absorber of shock waves or sound waves. The honeycomb block's superior sound dampening characteristics result from the use of perforated honeycomb material as well as the use of thermoplastic (or thermoplastic elastomeric materials) for both the honeycomb core 16 and the facings 18 and 20. Chopped fibers of materials such as glass, plastics or polyetherimides (PEI), or elastomer-coated fabrics can be added to the honeycomb material in order to add to or vary the strength of the panel.

Where the panel will be used to dampen sound, the characteristics of the elastomer material can be varied to effect the level of acoustic absorption desired. An elastomer having a low resiliency rate tends to dampen sound by absorbing it, while an elastomer having a quicker return rate will tend to dissipate sound, thereby muffling it. The material can also be made frequency-selective so that it absorbs or dissipates sounds within a certain frequency range while allowing other sounds to pass through.

The core and/or facing sheets can also be made from sheets of woven fabric of a unidirectional, bidirectional, multidirectional or triaxial weave impregnated with a suitable thermoplastic resin. Such fabrics may be made from a wide variety of materials including glass, graphite, nylon and ceramics. High temperature thermoplastic resins in this format offer a wide variety of features heretofore unavailable. In addition to adding strength to the materials, the addition of the reinforcing fabrics reduces the weight since less resin is used. Products made of these materials would be produced using the same process described in our above identified copending patent except that in some cases the processing temperature would be higher.

Other favorable characteristics of the honeycomb block 10 include its durability and tear resistance. While the honeycomb block 10 is strong, it is also extremely lightweight. From a volumetric viewpoint, bare honeycomb (without facings) that is non-perforated is approximately 93% air. Perforated honeycomb has even less material and is therefore lighter yet. Even with the facings attached, the weight of the perforated honeycomb compares favorably with that of other acoustic insulation.

Figure 2:
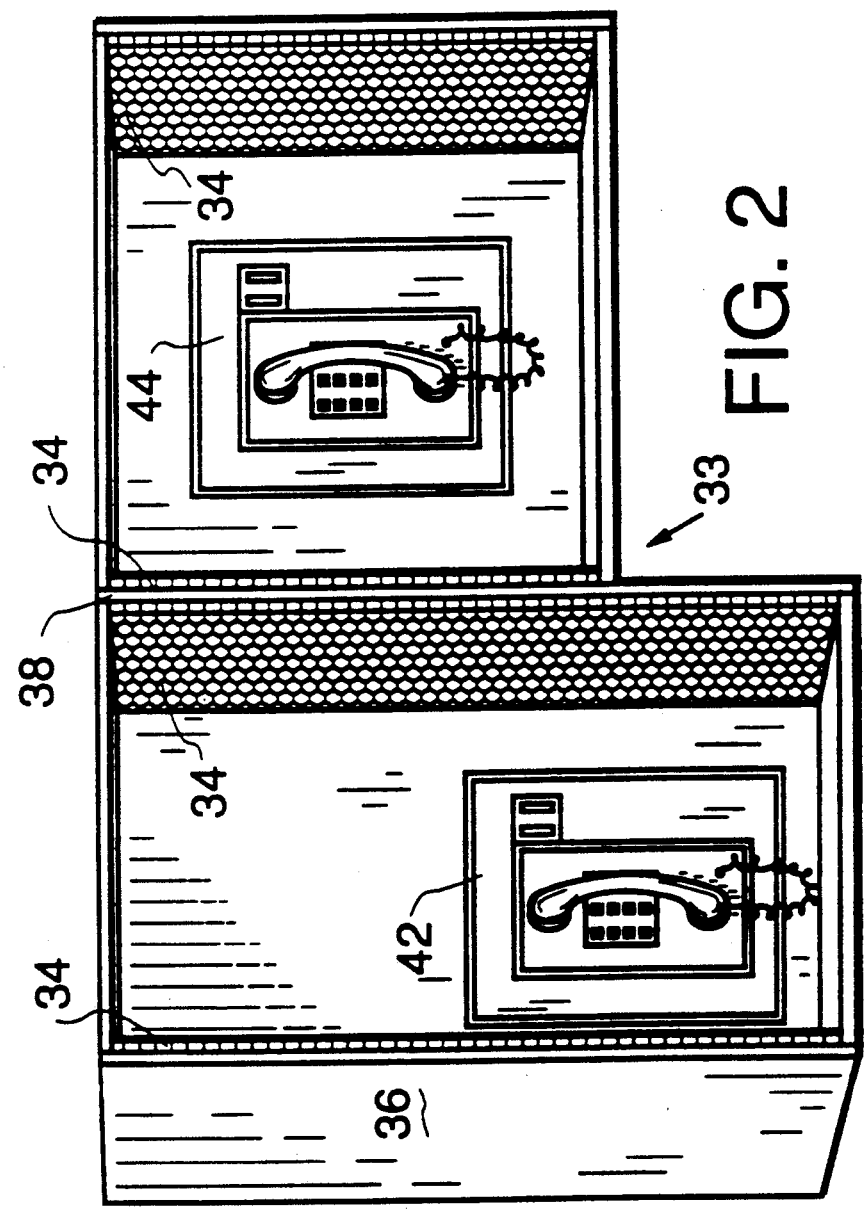
FIG. 2 is a perspective view of wall mounted public telephones showing the material of the present invention used for acoustic insulation disposed on the inside of telephone privacy panels to muffle sound.

FIG. 2 is a perspective view showing a set of privacy panels for wall-mounted public telephones 33. The perforated honeycomb of the present invention is shown used as acoustic insulation 34, disposed on the inside walls of the panels 36, 38 and 40 of both a handicap phone location 42 and the standard phone position 44. The honeycomb insulation 34 will muffle the voices of the people using the phones, thereby providing privacy as well as a quieter environment in which to carry on a conversation over the phone.

Figure 3:
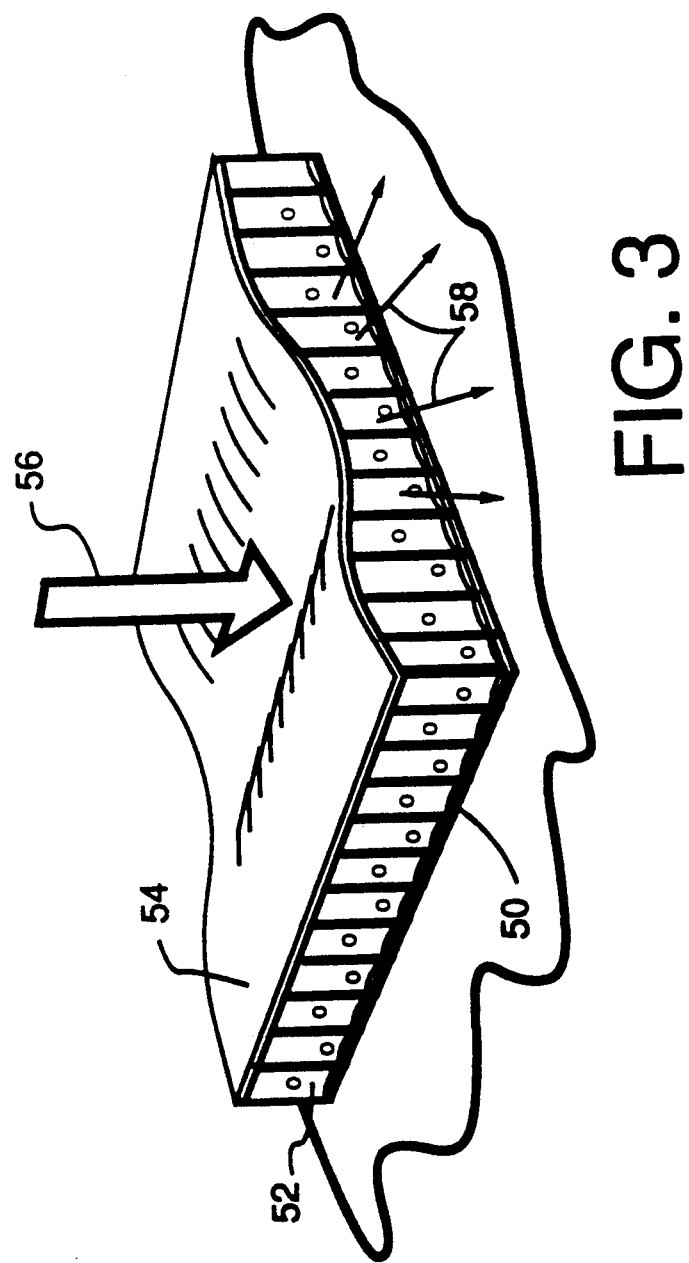
FIG. 3 depicts the present invention in use as a shock-absorbing cushion.

In FIG. 3, use of the present invention as a shock-absorbing cushion or pad is shown at 50. With only the core 52 being perforated, a force applied to the top surface 54, as suggested by the arrow 56, will cause the cushion to be compressed, tending to drive the air within the compressed cells of core 52 outwardly as indicated by the arrows 58. If the holes or perforations in the core material are small, they will tend to throttle the flow of escaping air and thereby absorb the shock of the applied force. The shock-absorbing characteristics of the pad are determined by both the resiliency of the thermoplastic materials and the number and size of the perforations. Note that for some applications it may also be desirable to provide perforations in the top and/or bottom sheets of facing material.

A pad of material provided in accordance with the present invention can be used to support and provide shock and vibration isolation between a vibrating mechanism, such as a motor or reciprocating actuator, and the surface upon which it rests. It can also be used to provide resilient padding for a wide variety of applications including furniture, auto seats, floor pads, etc.

Although the present invention has been described above in terms of the above specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A honeycomb panel having anisotropic flexing characteristics for dampening or dissipating pressure forces or waves, comprising:
   a honeycomb core formed of undulated strips of resilient, thermoplastic material, thermal compression bonded together to form cell walls defining a plurality of contiguous regularly shaped cells, the walls of which have a plurality of perforations;
   a first facing sheet of said resilient thermoplastic material, thermal compression bonded to an upper surface of said core formed by the upper extremities of said cell walls, the bonding being accomplished by simultaneously applying heat and pressure to the joinder of said first facing sheet and said core; and
   a second facing sheet of said resilient thermoplastic material, thermal compression bonded to a lower surface of said core formed by the lower extremities of said cell walls, the bonding being accomplished by simultaneously applying heat and pressure to the joinder of said second facing sheet and said core.

2. A honeycomb panel as recited in claim 1 wherein said first facing sheet contains a matrix of holes providing communicating passageways through said first facing sheet and into said cells.

3. A honeycomb panel as recited in claim 1 wherein said second facing sheet contains a matrix of holes providing communicating passageways through said second sheet and into said cells.

4. A sound-absorbing material for application to one or more walls of an enclosure-forming means comprising a sheet of honeycomb panel as recited in any one of claims 1, 2, or 3.

5. A shock-absorbing pad comprising a body of material cut from a honeycomb panel as recited in any one of claims 1, 2 or 3.

6. A honeycomb panel as recited in any one of claims 1, 2 or 3 wherein said material is a thermoplastic elastomer.

7. A honeycomb panel as recited in any one of claims 1, 2 or 3 wherein said material contains fibers of a different material.

8. A honeycomb panel as recited in any one of claims 1, 2 or 3 wherein said material is comprised of a woven fabric contained within a thermoplastic resin.

9. A honeycomb panel as recited in claim 8 wherein said fabric is of a weave selected from the group consisting of unidirectional, bidirectional, multidirectional and triaxial weaves.

* * * * *